Nov. 17, 1925.  1,562,079

A. V. CHAPIN
DISK HARROW
Filed May 23, 1923   2 Sheets-Sheet 1

INVENTOR.
Andrew V. Chapin
BY M. C. Frank
ATTORNEY

Nov. 17, 1925.

A. V. CHAPIN

DISK HARROW

Filed May 23, 1923

INVENTOR.
Andrew V. Chapin
BY M. C. Frank
ATTORNEY

Patented Nov. 17, 1925.

1,562,079

UNITED STATES PATENT OFFICE.

ANDREW V. CHAPIN, OF FERNDALE, CALIFORNIA.

DISK HARROW.

Application filed May 23, 1923. Serial No. 640,976.

*To all whom it may concern:*

Be it known that I, ANDREW V. CHAPIN, a citizen of the United States, residing at Ferndale, in the county of Humboldt and State of California, have invented certain new and useful Improvements in Disk Harrows, of which the following is a specification.

My invention relates in general, to agricultural implements, and in particular, to disk harrows.

Disk harrows with which I am familiar, buckle upwards at the center very frequently in operation, and thus the depth of cut in the ground is not uniform. Also, the inner disks occasionally crowd and crush themselves. Also, when a snag is encountered, I find it quite difficult to disadjust the gangs of disks by the usual levers.

In my invention I seek to overcome the above deficiencies found, therefore, my primary object is the provision of a harrow having adjustable gangs of disks that will cut evenly and at a uniform depth.

Another object is the provision of a simple shackle means for pivotally connecting the disk gangs together and without interference, regardless of the angular position of the gangs.

Another object is the provision of effective means for effecting the angular position of the gangs with respect to each other and without the use of levers; also means for limiting the angular position.

A further object is to provide the frame of each gang with upstanding braces, to support a cross-bar that will prevent buckling of the gangs at the center when in operation.

And a still further object is to provide a quick acting and easy releasing means for the gangs of the harrow, when the latter binds in cutting or in striking a snag.

Other objects and advantages, and the features of construction, will appear in the subjoined description of the accompanying two sheets of drawings, illustrating the present embodiment of my invention, and in which.

Adverting to the drawings and the figures thereof: The numeral 1 represents the frame for a series of cutter disks 2. 3 is a similar frame for the same purpose but constructed to the opposite hand. The frames in this instance, are constructed of angle-iron, the members of which are secured together in any approved manner.

Figure 2:
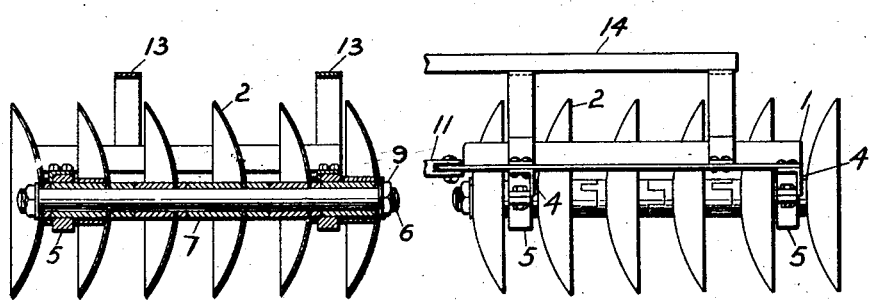
Figure 2 is a partial sectional elevation along the line A—A of Fig. 1 and looking in the direction of the arrows.

To the frame members 4 are secured bearings 5, to support a shaft 6. This shaft rigidly carries, and as a unit, the disks 2 spaced apart by spacers 7, which latter may be in two sections interlocking each other as at 8. When the series of disks are assembled, the end nuts 9 are tightened and the whole secured together as a unit, as shown in Fig. 2. This unit is then supported in the bearings 5 and the spacers may serve as the journals.

The rear member of each frame is extended and turned inward as at 10, and these members are pivotally connected together by a shackle 11. The shackle permits ease of movement at this union, and in conjunction with a chain 12 or the like, to be later described, keeps the innermost disk of each gang apart from each other to avoid crushing or breaking or other interference.

To each frame and near the outer ends thereof, are secured inverted U-braces 13, the top surfaces of which register in a plane parallel to the axes of the shafts 6. The said braces movably support a cross-bar 14, preferably of channel form, on the said surfaces. Near each end of the cross-bar is a slot 15, for permitting the bar to slidably engage a fixed bolt 16 or the like, secured to each outermost brace 13. The purpose of the cross-bar will be later set forth.

To the front member of each frame near its inner end, is secured an arm 17, the free end of which pivotally engages the link of a chain 12 aforementioned. To the center of the latter chain is attached a control chain 18, adapted for adjustable connection to a draft appliance.

The said draft appliance consists of a member adapted to be engaged by power applied to link 19. Diametrically opposite this link is a hook 20, to engage the control member 18 as will be presently set forth. Pivotal arms 21 extend from each side of the draft member and engage chain members 22 or the like, which latter are pivotally and adjustably connected near the extremities of the front members of the frame by the clevis 23, through holes 24 in the frame.

Figure 1:
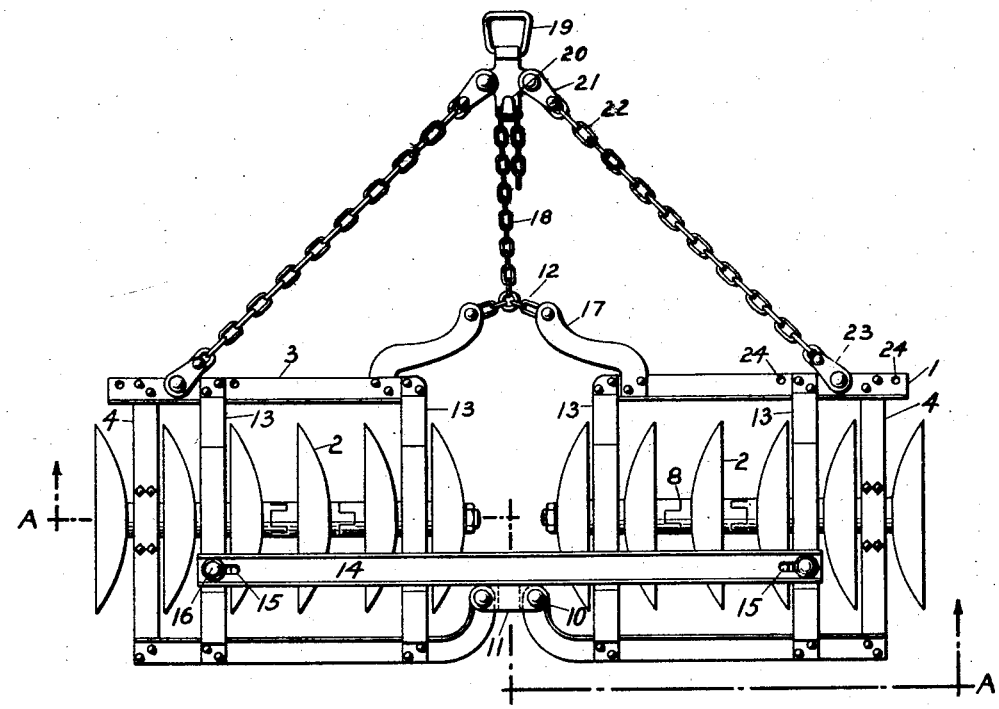
Figure 1 shows a plan of the harrow constructed in accordance with my invention.
Figure 3:
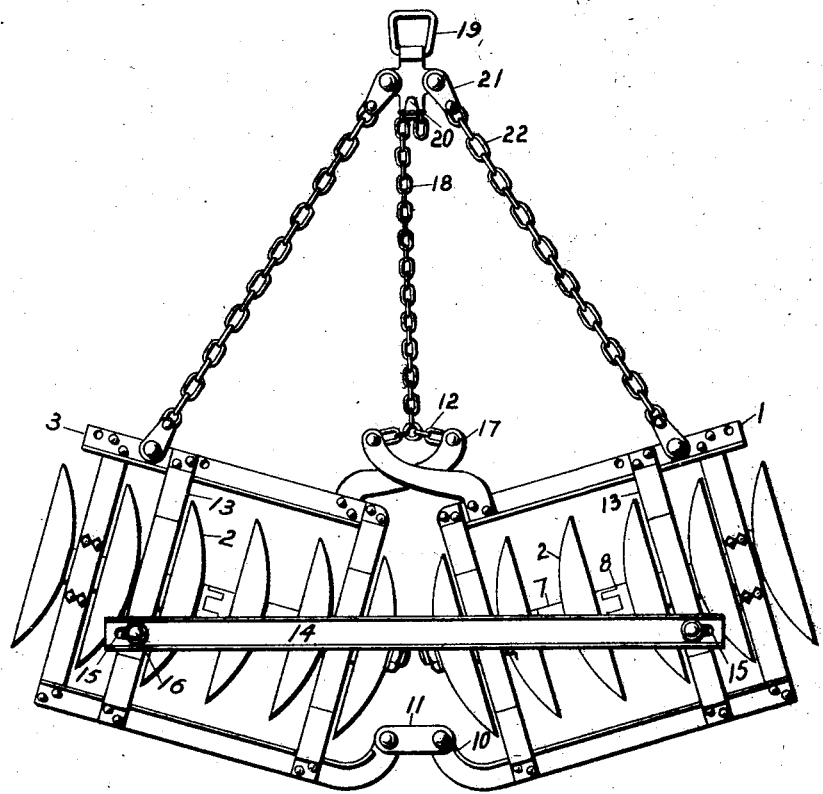
Figure 3 is a plan of the harrow with the disk gangs in an angular position ready for working engagement.
Figure 4:
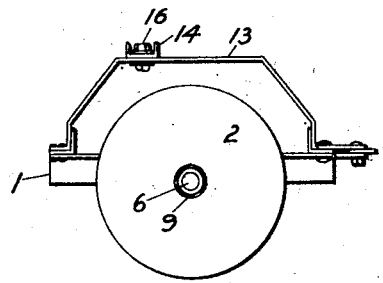
Figure 4 is an end elevation of Fig. 1, showing in particular the upright braces supporting the cross-bar thereon.

In operation, and as shown in Fig. 1, the harrow simply rides or rolls over the ground, but when the control chain is hooked as in Fig. 3, the harrow, when the draft is applied, assumes an angular position to correspond with the link of the control chain engaged on the hook 20, thus the degree of earth-cut is determined by the angle one gang makes with the other.

When the chain 12 is in a straight line (approaching in Fig. 3) from arm to arm, the limit of angular position has been reached, the length being such as to prevent the inner disks from touching.

Should the harrow bind, or strike a snag while in engagement, the draft appliance is moved backwards by hand, and the control chain disengaged and a new link nearer the chain 12 engaged. When the draft is again applied, the harrow will easily and immediately straighten as shown in Fig. 1, and ride out of the difficulty.

Regardless of the angular position of the two sets of disks, it will be observed that the cross-bar is always on the top surface of the braces, thus buckling at the center is prevented and an even depth of ground-cut is assured.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired, as fall within the scope of the appended claims.

Having thus described my invention, what I claim as new and desire to secure by Letters Patent of the United States, is the following:

1. A harrow comprising frames, gang disks and a cross-bar, the frames being pivotally connected together by a shackle and each frame thereof provided with a gang of disks and with U-braces arranged transversely thereon to slidably support the cross-bar above said gang disks, to keep the frames substantially in the same plane.

2. A harrow comprising a right and a left-hand frame, a gang of disks supported in each frame, a shackle connecting the frames together, arms on the frames opposite the shackle, flexible draft elements connected to the outer approximate extremities of the front of said frames and having a draft appliance connected therebetween, a flexible element of fixed length connected to the extremities of said arms and having a flexible draft element leading therefrom and adapted for coupling to said draft appliance for determining the angular working positions of the harrow, the said element of fixed length determining the maximum non-interference angular position of the gang disks when the said arms are in maximum embrace.

3. A harrow comprising a right and a left-hand frame, a gang of disks supported in each frame, a shackle connecting the frames together, arms on the frames opposite the shackle, yielding draft elements connected to the outer approximate extremities of the front of said frames and having a draft appliance connected therebetween, a yielding element of fixed length connected to the extremities of said arms and having a yielding draft element leading therefrom and adapted for coupling to said draft appliance for determining the angular working positions of the harrow, the said element of fixed length determining the maximum non-interference angular position of the gang disks when the said arms are in maximum embrace, and a cross-bar slidably engaging the said frames above the gang disks for determining uniform depth of earth-cut.

In testimony whereof I affix my signature.

ANDREW V. CHAPIN.